Patented Nov. 2, 1943

2,333,390

UNITED STATES PATENT OFFICE 2,333,390

DICYANDIAMIDE-FORMALDEHYDE REACTION PRODUCT

Kurt E. Ripper, Bronxville, N. Y., assignor to American Cyanamid Company, New York, N. Y., a corporation of Maine No Drawing. Application April 9, 1940, Serial No. 328,741

4 Claims. (Cl. 260—72)

This invention relates to the production of relatively stable intermediate reaction products obtained by the condensation of dicyandiamide and melamine with an aldehyde such as formaldehyde.

In my application Serial No. 311,935, Patent No. 2,286,228, June 16, 1942, of which this is a continuation in part, I have described the production of dicyandiamide resins by modification thereof with melamine to give materials which have outstanding hot water resistance when polymerized into the insoluble and infusible form. The products described therein are exceptionally useful for many purposes although, in the first stages of condensation and without guanidine carbonate, there may sometimes be the tendency to produce hydrophobe products which are not always desirable.

It is one of the objects of the present invention to prepare condensation products of dicyandiamide and melamine with formaldehyde or other aldehyde in the form of stable intermediate compositions.

It is a further object to prepare such products which may be diluted with water without causing precipitation of the condensation product.

It is a still further object to prepare intermediate condensation products in such a form as to permit their use in impregnating solutions.

These and other objects are attained by reacting dicyandiamide and melamine with an aldehyde under alkaline conditions at a temperature below boiling until there is obtained a relatively non-hydrophobe low-reacted product which, at room temperature, is of a creamy nature and which readily liquefies when heated above 50° C. and is capable of dilution without precipitation by addition of warm water. In this manner the condensation reaction is interrupted to give products which are substantially unpolymerized.

The following examples in which the proportions are in parts by weight are given by way of illustration since the invention is not restricted to the details thereof.

Example 1

| | Parts |
|---|---|
| Dicyandiamide (1 mol) | 420 |
| Melamine (¼ mol) | 158 |
| 37% formaldehyde (2 mols) | 810 |
| Sodium hydroxide | .24 |

The dicyandiamide and melamine are dissolved in the formaldehyde solution to which the sodium hydroxide was previously added. The mixture was heated to about 70° C. until a clear, homogeneous solution was obtained. This water-clear solution having a pH 8.1 (glass electrode) was allowed to react at 50° C. for six hours. The substantially clear solution of the reaction product was then cooled to room temperature, whereupon the condensation product became a creamy, white mass. This creamy product may be heated and at about 50° C. becomes again a water-clear solution which again forms the cream upon cooling to room temperature. If desired, the solution obtained by heating the cream may be diluted to any degree by the addition of any desired proportion of water of about the same temperature as the solution. The diluted solution can be used for impregnation or any other desired purpose. This cream may be kept over a long period of time during which it may be diluted with water as described.

In order to determine some of the properties of this cream, it was diluted with an equal quantity of water and the dilute solution was used to impregnate sheets of all-cotton paper (.007 inch thick). This was done by dipping the sheets in the solution and then allowing them to dry at room temperature (25° C.) for about thirty-six hours, after which the sheets were further dried by placing them in a drying oven for about five minutes at 70° C. Five of the dried sheets so treated were stacked and the stack placed between stainless steel plates, the whole assembly then being placed in a suitable hydraulic press. The temperature of the press was raised to 140°–145° C. and pressure was kept at 1125 pounds per square inch for thirty minutes. The press was then allowed to cool and there resulted a perfect, homogeneous, translucent laminated sheet having high gloss. A sample of the laminated sheet showed, after thirty minutes immersion in boiling water, not the slightest sign of delamination or disintegration. The laminated sheet contained about 61% resin, was .032 inch in thickness and after the thirty minute boil was found to have absorbed 7.7% water.

Example 2

| | Parts |
|---|---|
| Dicyandiamide (1 mol) | 168 |
| Melamine (¼ mol) | 63 |
| 37% formaldehyde (2.5 mols) | 405 |
| Sodium hydroxide | .62 |

This mixture is reacted similarly to that described in Example 1 and here, again, a cream is the final product and this cream has substantially the same properties as described for the product of Example 1.

Similarly other variations may be made in carrying out the process in that the ratio of formaldehyde may be changed as desired although for the combination of 1 mol dicyandiamide and ¼ mol melamine, 2 to 2.5 mols of formaldehyde appear to give best results. Likewise the amount of melamine in the composition may be varied widely although about ⅛ mol melamine for each mol of dicyandiamide appears to be the minimum amount which should be used to obtain best hot water resistance in the finished plastic for which the reaction product is utilized. With increasing amounts of melamine, it is obviously necessary to vary the ratio of formaldehyde accordingly. Excellent results are obtained using ratios of about 2 mols formaldehyde for each mol of dicyandiamide and for each mol of melamine.

For superior results the condensation reaction is carried out under alkaline conditions. By doubling the amount of sodium hydroxide in Example 1, the reaction mixture is pH 8.52. By using four times as much sodium hydroxide as is given in Example 1, the reaction mixture is pH 9.32, both pH determinations being made by the glass electrode. However, the intermediate product in the form of cream is substantially the same in each of the variations as in the original. The temperature of reaction may be varied somewhat although with increased temperature, it is usually desirable to decrease the time of reaction.

Together with, or in place of the formaldehyde mentioned in the examples, it will be obvious that I may use equivalent quantities of other aldehydes as found suitable and desirable. As will be noted, the proportion of aldehyde may be varied widely.

The creams prepared in accordance with the present invention are susceptible of a wide variety of uses since they are stable for long periods of time and may be diluted, if desired, to any degree with warm water and the dilute solution may be used for impregnation as desired. As has been pointed out in my prior application, Serial No. 311,935, these products are useful for lamination, building materials, electrical insulation, adhesives, treatment of textiles and other fibrous products, etc. In their finally cured condition these products have high hot water resistance, as well as outstanding strength and electrical resistance.

It will be obvious that other changes and variations may be made in carrying out my invention without departing from the spirit and scope thereof as defined in the appended claims.

I claim:

1. A process which comprises reacting formaldehyde with a mixture containing dicyandiamide and melamine in a molar ratio between about 8:1 and 4:1, the reaction being carried out under alkaline conditions and by heating at a temperature of about 50° C. until there is formed a low-reacted substantially non-hydrophobe and relatively stable intermediate product which is of a creamy nature at room temperature and which readily liquefies when heated above 50° C.

2. A process which comprises reacting formaldehyde with a mixture containing dicyandiamide and melamine in a molar ratio between about 8:1 and 4:1, the reaction being carried out at a pH between about 8 and 9 and by heating at a temperature of about 50° C. until there is formed a low-reacted substantially non-hydrophobe and relatively stable intermediate product which is of a creamy nature at room temperature and which readily liquefies when heated above 50° C.

3. A process which comprises reacting 1 mol dicyandiamide and ¼ mol melamine with 2.5 mols formaldehyde at a pH of about 8–9 by heating at a temperature of about 50° C. for a period of about six hours until there is formed a low-reacted substantially non-hydrophobe intermediate reaction product which is of a creamy nature at room temperature and which readily liquefies when heated to about 50° C. and which can be diluted with warm water.

4. A substantially stable unpolymerized low-reacted non-hydrophobe condensation product of formaldehyde with dicyandiamide and melamine in the molar ratio between about 8:1 and 4:1 prepared by heating under alkaline conditions at a temperature of about 50° C., said product being of a creamy nature at room temperature, readily liquefying when heated to about 50° C. and being capable of dilution with warm water without precipitation.

KURT E. RIPPER.